United States Patent
Hoefken

(10) Patent No.: US 8,434,744 B2
(45) Date of Patent: May 7, 2013

(54) STIRRING DEVICE FOR ACTIVATED SLUDGES

(75) Inventor: Marcus Hoefken, Erlangen (DE)

(73) Assignee: Invent Umwelt-und Verfahrenstechnik AG, Erlangen (DE)

( * ) Notice: Subject to any disclaimer, the term of this patent is extended or adjusted under 35 U.S.C. 154(b) by 461 days.

(21) Appl. No.: 12/452,960

(22) PCT Filed: Jun. 19, 2008

(86) PCT No.: PCT/EP2008/004915
§ 371 (c)(1),
(2), (4) Date: Mar. 25, 2010

(87) PCT Pub. No.: WO2009/018873
PCT Pub. Date: Feb. 12, 2009

(65) Prior Publication Data
US 2010/0201008 A1    Aug. 12, 2010

(30) Foreign Application Priority Data
Aug. 9, 2007 (DE) .................. 10 2007 037 584

(51) Int. Cl.
B01F 3/04    (2006.01)

(52) U.S. Cl.
USPC .......................................... 261/93

(58) Field of Classification Search ............ 261/87, 261/91, 93
See application file for complete search history.

(56) References Cited

U.S. PATENT DOCUMENTS

| | | | | |
|---|---|---|---|---|
| 2,043,940 A | * | 6/1936 | Van Thiel | 261/93 |
| 2,055,065 A | | 9/1936 | Booth | |
| 2,085,947 A | * | 7/1937 | Booth | 261/93 |
| 4,066,722 A | * | 1/1978 | Pietruszewski et al. | 261/87 |
| 5,582,777 A | * | 12/1996 | Vento | 261/93 |

(Continued)

FOREIGN PATENT DOCUMENTS

| | | |
|---|---|---|
| DE | 900087 | 12/1953 |
| DE | 35 19 520 A1 | 12/1986 |

(Continued)

OTHER PUBLICATIONS

Hoeflien M.; Bischof F.; Durst F.: "Kombiniertes Ruehr—und Begsaungs system fuer die Abwasser-und Schlammbehandlung" Korrespondenz Abwasser, Abwassertechnische Vereinigung, St. Augustin, DE, Bd 40, Nr. 12, Dec. 1, 1993, p. 1904-1909.

(Continued)

*Primary Examiner* — Charles Bushey
(74) *Attorney, Agent, or Firm* — Manabu Kanesaka

(57) ABSTRACT

A stirring device for activated sludges contained in a basin includes a stirring body having a hyperboloidal wall with a lower circumferential surface, and a funnel-shaped recess underside the hyperboloidal wall; a shaft attached to the stirring body; an air supply line adapted to extend along a bottom of the basin and having a vertical section to supply air into the recess of the stirring body; a disk arranged underside the stirring body and spaced away from the lower circumferential surface to form an annular gap therewith; and shear ribs formed under the lower circumferential surface to extend along the lower circumferential surface and surround the annular gap. The vertical section of the air supply line extends coaxially through the disk in relation to the shaft so that when the stirring body is rotating, the shear ribs distribute air bubbles through the annular gap.

10 Claims, 5 Drawing Sheets

U.S. PATENT DOCUMENTS

Figure 1:
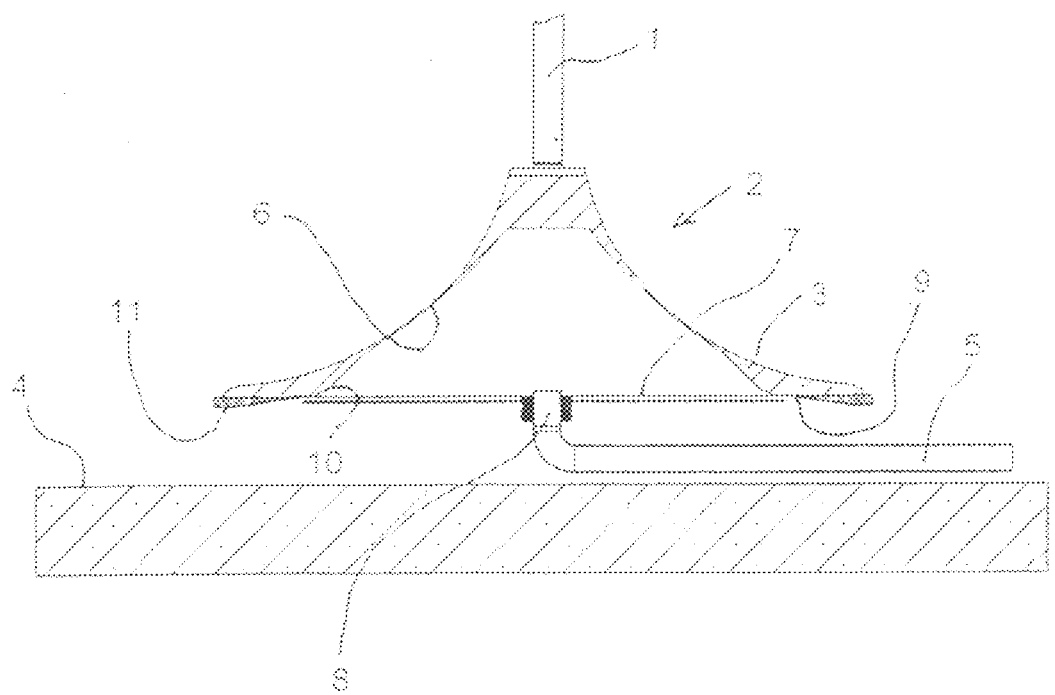

| | | | | |
|---|---|---|---|---|
| 5,904,423 | A | * | 5/1999 | Forschner et al. ............ 366/317 |
| 7,784,769 | B2 | * | 8/2010 | Hoefken .......................... 261/85 |
| 2001/0022755 | A1 | * | 9/2001 | Holtzapple et al. ............ 366/265 |
| 2005/0161838 | A1 | * | 7/2005 | Hofken ........................... 261/93 |

FOREIGN PATENT DOCUMENTS

| | | |
|---|---|---|
| DE | 36 03 466 A1 | 8/1987 |
| DE | 91 06 639 | 9/1991 |
| DE | 42 18 027 A1 | 12/1992 |
| DE | 198 26 098 | 12/1999 |

OTHER PUBLICATIONS

Hoefken M; Huber P; Hardes H; "Geruehrt und nicht . . . -Ruehr- und Begassungssysteme fuer die effective Abwasserbehandlung" Brauindustrie, Bd 2, 1998, pp. 91-95.

Hoefken M et al; "Novel Stirring and Aeration System for biological and Chemical Reactors" FED/Industrial Applications of Fluid Mechanics (Conference Info; Proceedings of the ASME Winter Annual Meeting, Atlanta, USA); Bd 132, Jan. 1, 1991, pp. 47-59.

Hoefken M. et al; "Modular Sewage Treatment System for Mediterranean coastal cities" Conference Info; Proceedings of the IAWPRC/EAWPRC-Conference Waste Water Treatment in Coastal Areas, Bd 25, nr. 12, Jan. 1, 2992, pp. 287-192.

Bischof F et al; "Abwasser energiesparsam umwaelzen" Umwelt, Springer-VDI Verlag Duesseldorf, DE, Bd. 21, Nr. 3, Mar. 1, 1991, pp. 126-128.

Zlokarnic M et al; "Ruehrtechnic" Jan. 1, 1987, pp. 188-206.

* cited by examiner

STIRRING DEVICE FOR ACTIVATED SLUDGES

The invention relates to a stirring device for activated sludges.

Such a stirring device is known from DE 42 18 027 A1. With the known stirring device, air is supplied to a funnel-like recess on an underside of a hyperboloid-like stirring body via an air supply line. Shear ribs with which the supplied air is distributed in the surrounding activated sludge in the form of little air bubbles are provided on a lower circumferential boundary. Studies have shown that a size distribution of the air bubbles created by this is not particularly homogeneous. During this, undesirably large air bubbles are also created occasionally.

The object of the invention is to eliminate the disadvantages in accordance with prior art. In particular, a stirring device for activated sludges is to be specified with which air bubbles with a bubble size distribution as homogeneous as possible can be created in a liquid surrounding the stirring body.

This object is solved by the features of first aspect. Useful embodiments of the invention result from the features of second to thirteenth aspects.

According to the provisions of the invention, it is provided that an opening of the recess formed on an underside is covered with a covering element in such a way that an annular gap with a specified width remains free between a lower circumferential surface of the stirring body and the covering element, and that the air supply line is led coaxially through the covering element in relation to the shaft. Due to the provision of the covering element suggested by the invention, the air supplied to the recess is now supplied through the annular gap in the area of a circumferential boundary of the stirring body. The formation of air bubbles with an undesirably large bubble diameter can be counteracted by suitable selection of the specified width of the annular gap. A particularly homogeneous bubble distribution in the liquid medium surrounding the stirring body can be created. Leading the air supply line coaxially in relation to the shaft through the covering element ensures that the air supplied to the recess essentially only escapes again through the annular gap. The size distribution of the air bubbles generated by the suggested stirring device is distinguished by a relatively small, average bubble diameter and by a monomodal size distribution.

In an advantageous embodiment of the invention, the annular gap has a width in the range from 1 cm to 15 cm, preferably 2 to 10 cm. Moreover, essentially radially running shear ribs extending from a radially outer area of the lower circumferential surface can be provided. In this connection, a height of the shear ribs increases advantageously towards an outer circumferential boundary of the stirring body. The previously stated features further contribute to the making of a bubble-size distribution and a low average bubble diameter. The average bubble diameter can, for example, be in the range from 1 mm to 10 mm, preferably 2 mm to 8 mm.

In a further advantageous feature, the covering element has a rotationally symmetrical shape. It can be a disk or a cone with its tip protruding into the recess or a hyperboloid-type body. A further outer circumferential boundary of the covering element can be toothed or also can have slits running radially towards the inside. In case of the embodiment of the covering element as a cone protruding into the recess or as a hyperboloid-like body, the volume of air in the recess can be small and an undesired buoyancy of the stirring body caused by this can be minimized. The suggested structures on the further circumferential boundary of the covering element permit a particularly uniform air outlet throughout the entire circumferential boundary of the stirring body. A dispersion with a particularly homogeneous bubble size distribution can be generated with this throughout the entire circumference of the stirring body.

In a first alternative embodiment, the covering element is firmly attached relative to the stirring body to a frame carrying the shaft or to a bottom of a basin. If the covering element is provided on a frame carrying the shaft, the stirring device can be designed completely as a mounting unit. In this connection, a motor to drive the shaft suspended thereon is provided on a tip of the frame which is usually designed like a tower and surrounds the stirring body. A height of the frame can be designed such that the motor is located either above a surface level of the liquid medium to be agitated, or also under a surface level of same. Reference is made to the disclosure of DE 42 18 027 A1 as well as the disclosure of DE 198 26 098 C2 which is herewith incorporated.

To avoid an undesired precession movement of the shaft, it is useful to provide that the shaft is led through the stirring body and is held on its one end in a safety bearing provided in the covering element. In case of an embodiment of the covering element as a disk, the shaft can also be led through the disk and be held in a safety bearing provided underneath.

In a second alternative embodiment, the covering element is firmly connected via connection means to the wall of the stirring body. In other words, in this case, the stirring body and the covering element form one unit. In this connection, the connection means can comprise essentially radially running bars extending from the inner side of the wall to an upper side of the covering element facing the recess. Such bars advantageously only extend over an outer radial section of the covering element. With the suggested second alternative embodiment, the covering element can be advantageously held rotatably in a safety bearing surrounding the air supply line.

With a version of the second alternative embodiment, the covering element is designed as a hyperboloid-like further stirring body which is connected to the stirring body in such a way that its further tip points away from the recess of the hyperboloid-like stirring body. In other words, the hyperboloid-like stirring body and the hyperboloid-like further stirring body are arranged mirror-symmetrically in relation to a rotational plane running vertically through the shaft. The suggested embodiment has the advantage that the covering element designed in the form of a hyperboloid-like further stirring body develops a current directed towards the further stirring body in the area of the bottom which current curves around this and is radially directed to the outside on its circumferential boundary. Undesired deposits in the area of the bottom of the basin are avoided by the formation of such a current.

Figure 2A:
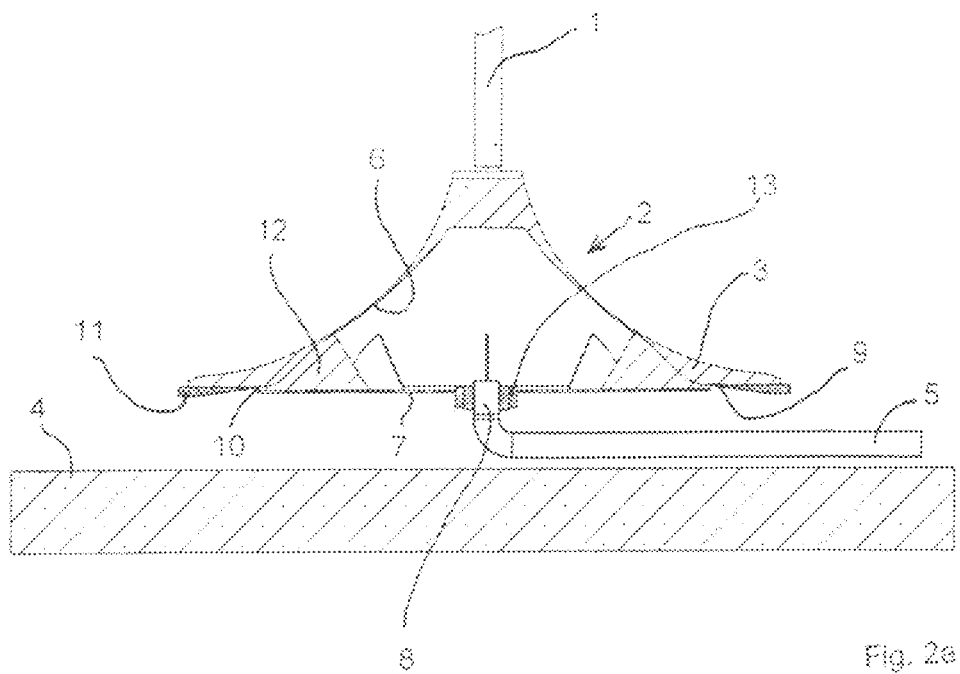
Figure 2B:
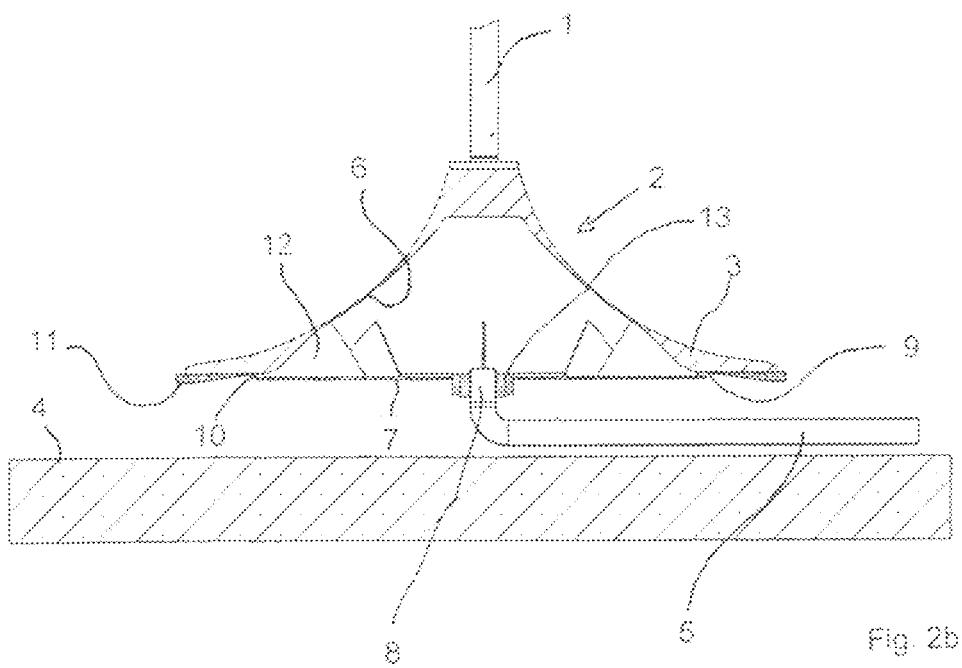
Figure 3:
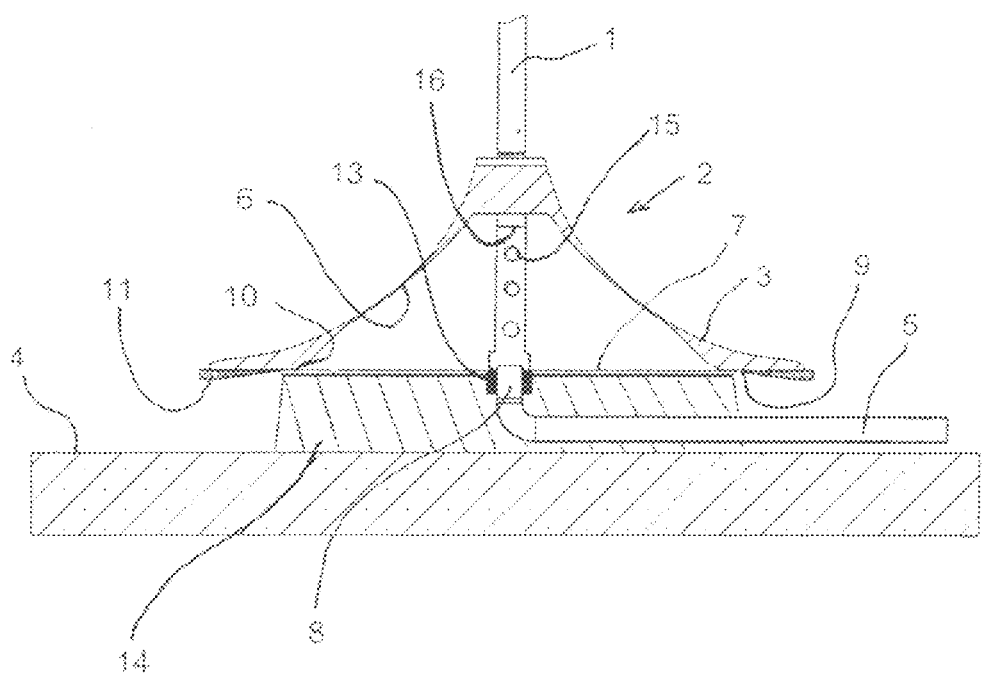
Figure 4:
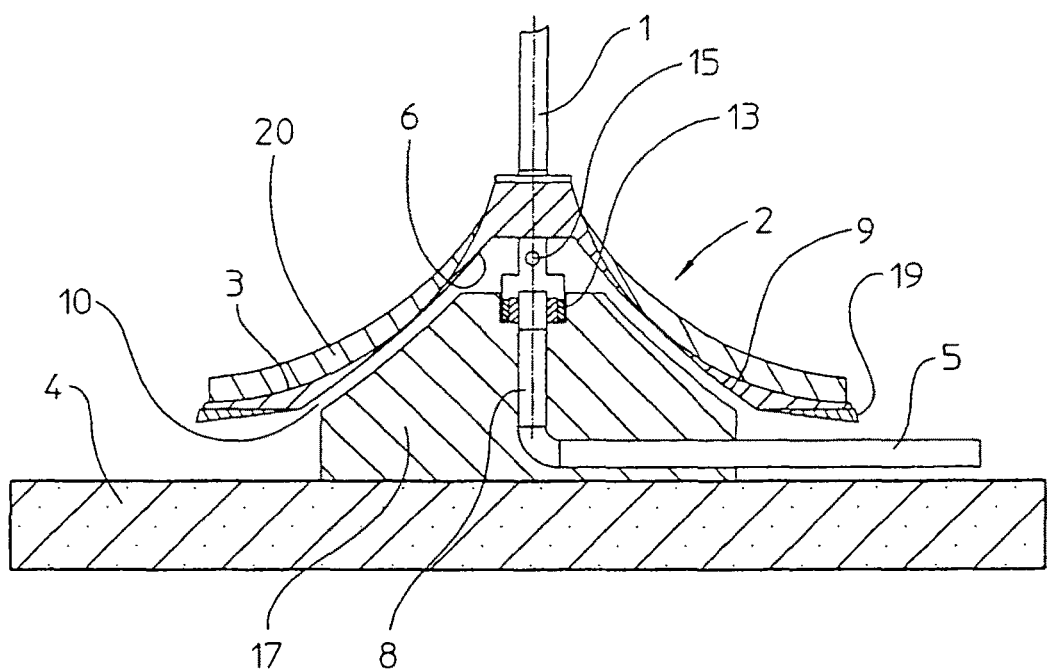

The invention will now be described in more detail using examples based on the drawings. The drawings are:

FIG. 1 a schematic cross sectional view of a first stirring device,

FIG. 2a a schematic cross sectional view of a second stirring device,

FIG. 2b a further schematic cross sectional view as per FIG. 2a,

FIG. 3 a schematic cross sectional view of a third stirring device,

FIG. 4 a schematic cross sectional view of a fourth stirring device and

Figure 5:
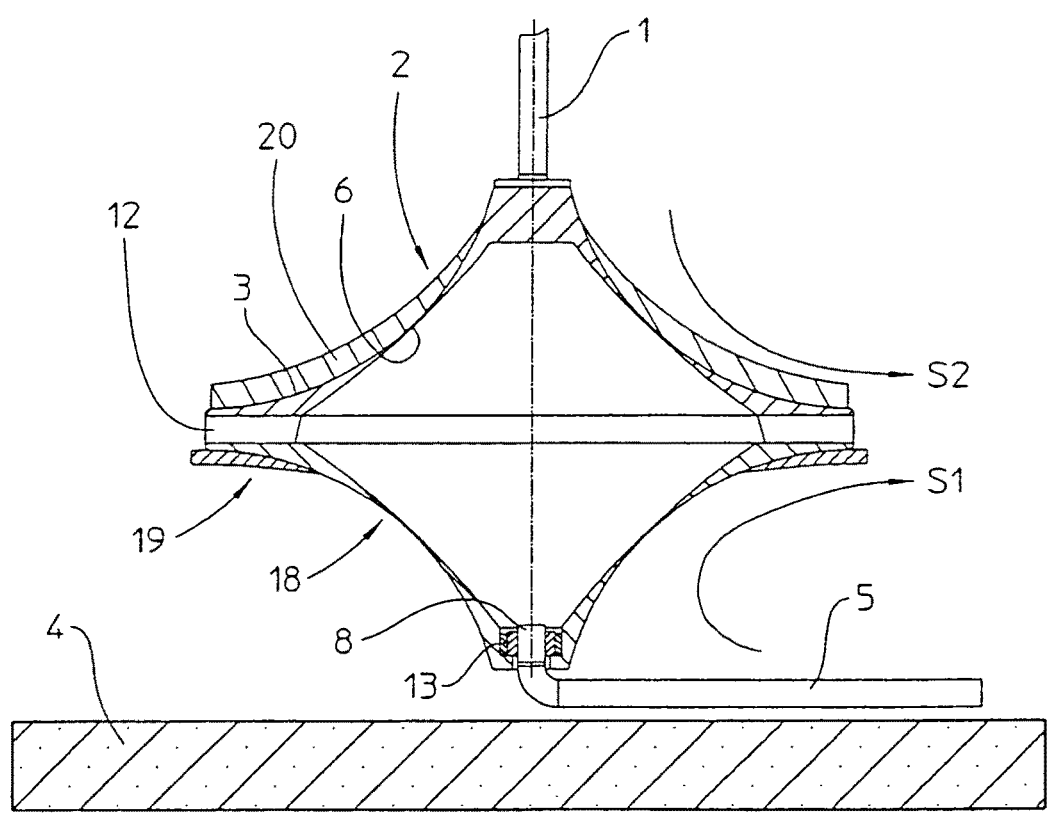

FIG. 5 a schematic cross sectional view of a fifth stirring device.

With the first stirring device shown in FIG. 1, a stirring body 2 is attached to a shaft 1. A wall 3 of the stirring body 2 has a hyperboloid-like shape. An air supply line 5 runs in the vicinity of a bottom 4 of a (not shown here) basin to supply air into a funnel-like recess 6 on an underside of the stirring body 2 opposite the bottom 4. An opening of the recess 6 facing the bottom 4 is covered with a disk 7. A vertically running section 8 of the air supply line 5 is led through a center of the disk 7. The disk 7 can be attached firmly or also rotatably to the vertically running section 8. Naturally, it is also possible that the disk is attached firmly on the bottom 4 via suitable support elements. In this embodiment, the disk 7 is either permanently or also freely rotatably supported relative to the stirring body 2. The suggested rotatability of the disk 7 helps to diminish a current resistance to a rotating current created by the stirring body 2.

An annular gap 10 is formed between a lower circumferential surface 9 of the stirring body 2 and a first circumferential boundary of the disk 7. Essentially radially running first shear ribs 11 are provided in a radial section of the lower circumferential surface 9 located further outside. A height of the shear ribs 11 preferably increases in a direction pointing radially to the outside.

The air supplied through the air supply line 5 is now forced through the annular gap 10 through the covering of the recess 6 via the disk 7. The escaping air is then distributed in the form of fine air bubbles in the surrounding liquid medium by the rotating stirring body 2, in particular the shear ribs 11 provided on the lower circumferential boundary 9.

With the second stirring device 2 shown in FIGS. 2a and 2b, the disk 7 is firmly connected to an inner side of the wall 3 via connection bars 12 essentially extending in a radial direction. The disk 7 is in turn designed and/or arranged relative to a lower circumferential surface 9 of the stirring body 2 so that an annular gap 10 remains free. The vertical section 8 of the air supply line 5 is led through the center of the disk 7. A safety bearing 13 surrounding the vertical section 8 connects the disk 7 with the vertical section 8.

Also with the second device shown in FIGS. 2a and 2b, the air supplied into the recess 6 via the air supply line 5 essentially exits via the annular gap 10 in the vicinity of the lower circumferential surface 9 and is distributed finely into the surrounding liquid medium, in particular, due to the effect of the rotating shear ribs 11.

In the exemplary embodiments shown, each recess 6 is covered with a disk 7. Instead of the disk 7, however, another differently designed means of covering can also be used. For example, it is possible to use cone-like or also hyperboloid-like formed covering means instead of the disk 7 so that only a gap for supplying the air to the annular gap 10 remains between an inner side of the wall 3 and the covering means. This can be used to minimize the buoyancy generated in the recess 6 by supplying the air.

FIG. 3 shows a schematic cross sectional view of a third stirring device. The third stirring device is designed similarly to the first stirring device. In this connection, however, the disk 7 is part of a base 14—also disk-shaped—supported on the bottom 4. The air supply line 5 and the vertical section 8 of the air supply line 5 are affixed to the base 14 which is preferably made of concrete. A section of the shaft 1 which passes through the stirring body 2 is held rotatably in the safety bearing 13 surrounding the vertical section 8. In this case, the safety bearing 13 is usefully held in the base 14. The section of the shaft 1 passing through the stirring body 2 has ventilation openings 15 through which the air supplied into the recess 6 by the air supply line 5 is introduced. For this purpose, the section passing through the shaft 1 is provided with a separating wall 16.

The embodiment suggested here of the fixation of the air supply line 5 of the vertical section 8 as well as of the safety bearing 13 surrounding the vertical section 8 can naturally also be applied for the second stirring device. In order to keep a flow resistance as low as possible in this case, however, a sufficient distance must be provided between an underside of the disk 7 and an upper side of the base 14 facing the stirring body 2.

FIG. 4 shows a fourth stirring device which is designed similarly to the third stirring device. Here, a further base 17 which can be made of concrete, for example, is designed in the form of a truncated cone whose tip protrudes into the recess 6. The safety bearing is provided in the area of the tip. Transport ribs 20 are attached to an outer side of the wall 3 pointing away from the recess 6, the height of whose ribs can increase in the direction of a circumferential boundary of the stirring body 2. The transport ribs 20 can also be curved in a top view (not shown here). Such transport ribs can naturally be used for the previously described embodiments.

FIG. 5 shows a schematic cross sectional view of a fifth stirring device. Here, the covering element is designed in the form of a hyperboloid-like further stirring body 18 whose shape corresponds to the stirring body 2. The further stirring body 18 is firmly connected to the stirring body 2 via connection bars 12. A further tip of the further stirring body 18 is pointing away from the recess 6. In other words, the stirring body and the further stirring body are essentially arranged mirror-inverted in relation to a rotational plane. The safety bearing 13 is arranged in the area of the further tip of the further stirring body 18. Reference sign 19 designates further shear ribs which are provided on an outer side of the further stirring body 18 pointing away from the recess 6 in a radially outer section. The arrows S1, S2 suggest the direction of currents being created in the case of a rotation of the stirring bodies. By providing a covering configured in the form of a hyperboloid-like further stirring body 18, a lower flow S1 is generated in the vicinity of the bottom 4 which curves around in the area of the further stirring body 18 and points in a radially outer direction. In similar fashion an upper flow S2 curves around the stirring body 2 and also points in a direction pointing radially of the stirring body 2.—With the suggested embodiment, it is possible, on the one hand, to generate particularly fine air bubbles in the medium to be agitated and, on the other hand, to radially transport these in the medium particular far away from the stirring body. Finally, an undesirable deposit of sediment on the bottom 4 of the basin can be avoided by the lower flow S1 being created.

The invention claimed is:

1. A stirring device for activated sludges contained in a basin comprising:
   a stirring body having a hyperboloidal wall with a lower circumferential surface, and a funnel-shaped recess underside the hyperboloidal wall;
   a shaft attached to the stirring body;
   an air supply line adapted to extend along a bottom of the basin and having a vertical section to supply air into the recess of the stirring body;
   a disk arranged underside the stirring body and spaced away from the lower circumferential surface to form an annular gap therewith, said disk having a radial length less than that of the stirring body; and
   shear ribs formed under the lower circumferential surface to extend along the lower circumferential surface and surround the annular gap, wherein the vertical section of the air supply line extends coaxially through the disk in relation to the shaft so that when the stirring body is rotating, the shear ribs distribute air bubbles through the annular gap.

2. A stirring device as defined in claim 1, wherein the annular gap has a width in the range of 1 cm to 15 cm.

3. A stirring device for activated sludges contained in a basin comprising:
   a stirring body having a hyperboloidal wall with a lower circumferential surface, and a funnel-shaped recess underside the hyperboloidal wall;
   a shaft attached to the stirring body;
   an air supply line adapted to extend along a bottom of the basin and having a vertical section to supply air into the recess of the stirring body;
   a disk arranged underside the stirring body and spaced away from the lower circumferential surface to form an annular gap therewith, said disk having a radial length less than that of the stirring body; and
   radially running shear ribs formed under the lower circumferential surface to extend along the lower outside circumferential surface and surround the annular gap
   wherein the vertical section of the air supply line extends coaxially through the disk in relation to the shaft so that when the stirring body is rotating, the shear ribs distribute air bubbles through the annular gap.

4. A stirring device as defined in claim 1, wherein a height of the shear ribs increases towards an outer circumferential boundary of the stirring body.

5. A stirring device as defined in claim 1, wherein the disk has a rotationally symmetrical shape.

6. A stirring device as defined in claim 1, wherein the disk is attached relative to the stirring body to a frame carrying the shaft.

7. A stirring device as defined in claim 1, wherein the shaft extends through the stirring body and connected with the disk by a safety bearing.

8. A stirring device as defined in claim 1, wherein the lower circumferential surface is an annular flat surface, and an outer edge of the disk is disposed under an inner portion of the lower circumferential surface of the stirring body.

9. A stirring device as defined in claim 8, wherein the shear ribs are disposed radially outside the outer edge of the disk.

10. A stirring device as defined in claim 9, wherein a height of the shear ribs increases from an inner edge of the shear ribs towards an outer edge of the shear ribs.

* * * * *